Figure 1:
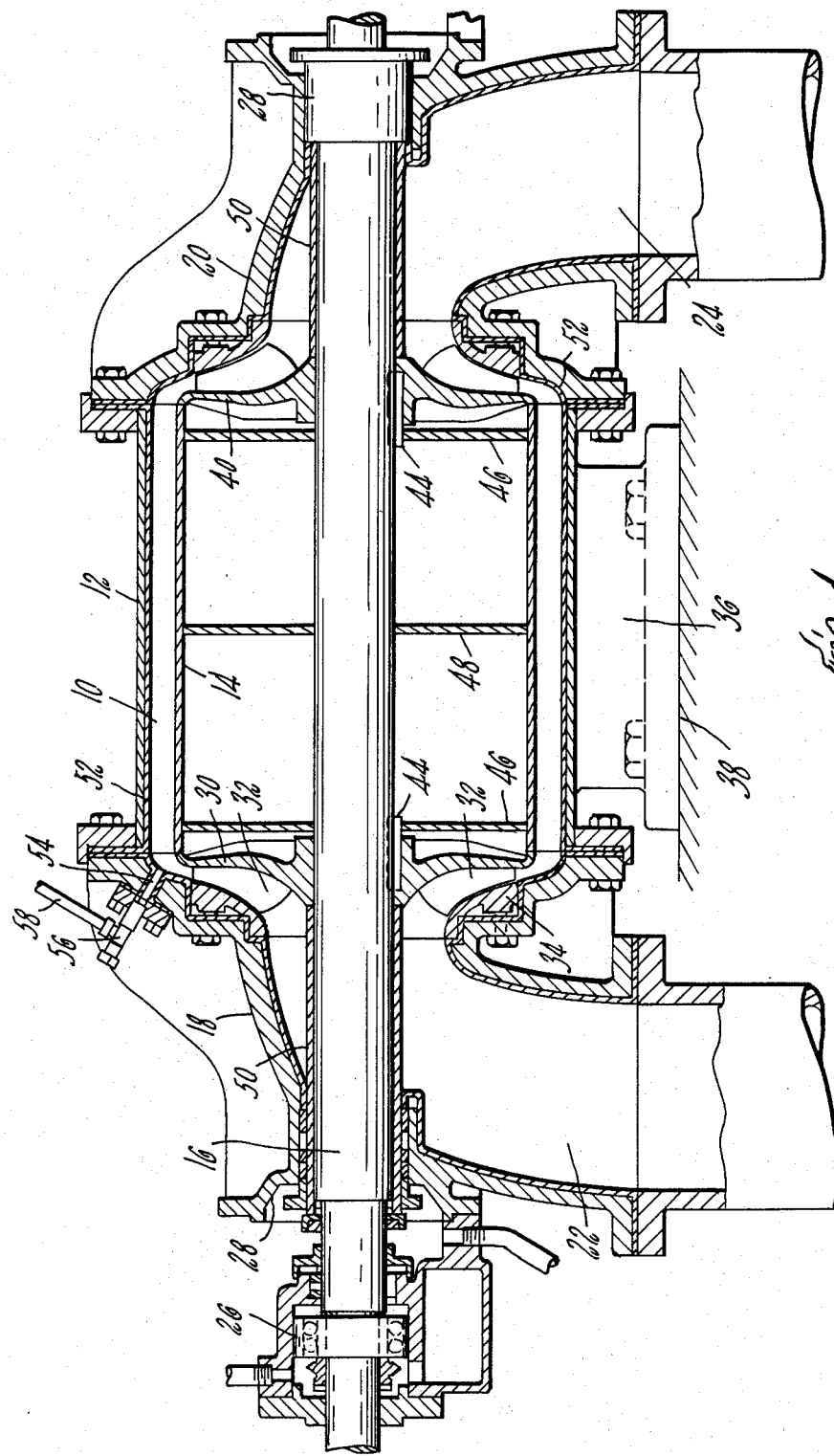

3,095,349
APPARATUS FOR CHLORINATING WOOD PULP
John P. Rich, Nashua, N.H., assignor to Improved Machinery Inc., Nashua, N.H., a corporation of Maine
Filed Feb. 10, 1960, Ser. No. 7,971
2 Claims. (Cl. 162—236)

This invention relates to pulp processing apparatus and more particularly to an improved method and apparatus for chlorinating wood pulp.

The addition of chlorine to pulp accomplishes a purification of the pulp due to the reaction of chlorine with lignin. Heretofore the usual practice in chlorinating wood pulp has been to add gaseous chlorine or a solution of chlorine and water to the pulp slurry so that the resulting slurry has a consistency of about three to three and one half per cent, which provides a uniform reaction of the chlorine with the lignin. The stock is then passed upwardly through a large tower in which it is agitated to prevent short circuiting and is retained in that tower for approximately ninety minutes in order to insure a sufficiently complete reaction. This long retention time has been believed necessary as a result of the not infrequent ineffective initial mixing of the chlorine gas and pulp whereby chlorine gas bubbles that are not dissolved in the initial mixing operation rise up through the tower until they dissolve into solution. In other words the chlorine is still in gaseous form when half way up in the tower, and has not started to react with the pulp. Therefore the chlorine concentration in the slurry is not sufficiently high and the reaction does not proceed at the theoretical rate.

It is an object of the invention to provide new and improved methods and apparatus for combining chlorine with pulp slurries for chlorination of the pulp.

Another object of the invention is to provide a chlorine-pulp mixing apparatus in which chlorine in the liquid phase is mixed with the pulp without the chlorine entering into the gaseous phase.

Still a further object of the invention is to provide a compact chlorine reacting vessel in which pulp and chlorine may be readily, efficiently and throughly mixed in large quantities and in a continuous operation, and which also acts as a centrifugal air separator.

In accordance with principles of the invention there is provided a pressure vessel with an annular chamber in which the chlorine may be mixed and reacted with the pulp. Pulp is introduced into this chamber under pressure and temperature conditions at which chlorine remains in its liquid phase (i.e. above the vapor pressure of chlorne). Chlorine in the liquid phase is directly introduced in controlled amounts into the reactant vessel and is completely mixed with the pulp in the chamber such that it never passes into the gaseous stage. The mixture is circulated within the chamber and when discharged the chlorine is intimately mixed with the pulp slurry so that no gaseous chlorine can escape. In the preferred embodiment the pressure vessel is defined between the inner wall of a cylindrical housing and the outer surface of a drum coaxially mounted within the housing and the pulp is introduced to this chamber by means of a pump impeller which is mounted coaxially with the drum on a shaft so that they are driven in rotation as a unit. The mixture is moved through the annular chamber along a generally helical path and at the output side of the pressure chamber there is provided a turbine impeller which is mounted on the same shaft as the pump impeller that is utilized to return some power to the system as the slurry pressure is reduced. With this apparatus the chlorine remains in liquid phase and never enters the gaseous phase and the troubles heretofore encountered due to the expansion of the chlorine from the liquid into the gaseous phase and the freezing of the pipes due to the "flashing" action are therefore avoided. The liquid chlorine is completely mixed with the pulp slurry under the pressure conditions so that the desired concentration is immediately obtained without waiting for the gaseous bubbles to dissolve in the slurry. As the mixture is a true solution even at much lower pressures the reduction in pressure at the outlet of the pressure chamber does not release chlorine gas. Among the advantages of this apparatus are the elimination of a chlorine vaporizer and gas handling equipment and the accompanying waste of chlorine is avoided. Another advantage is that the size of the retention tower can be substantially reduced as it no longer needs to perform a dual function. Further, by suitable design of the pump and turbine impellers, the apparatus may be used as the raw stock pump, drawing directly from the raw stock chest and pumping the stock all the way through the retention tower to the washer.

Figure 2:
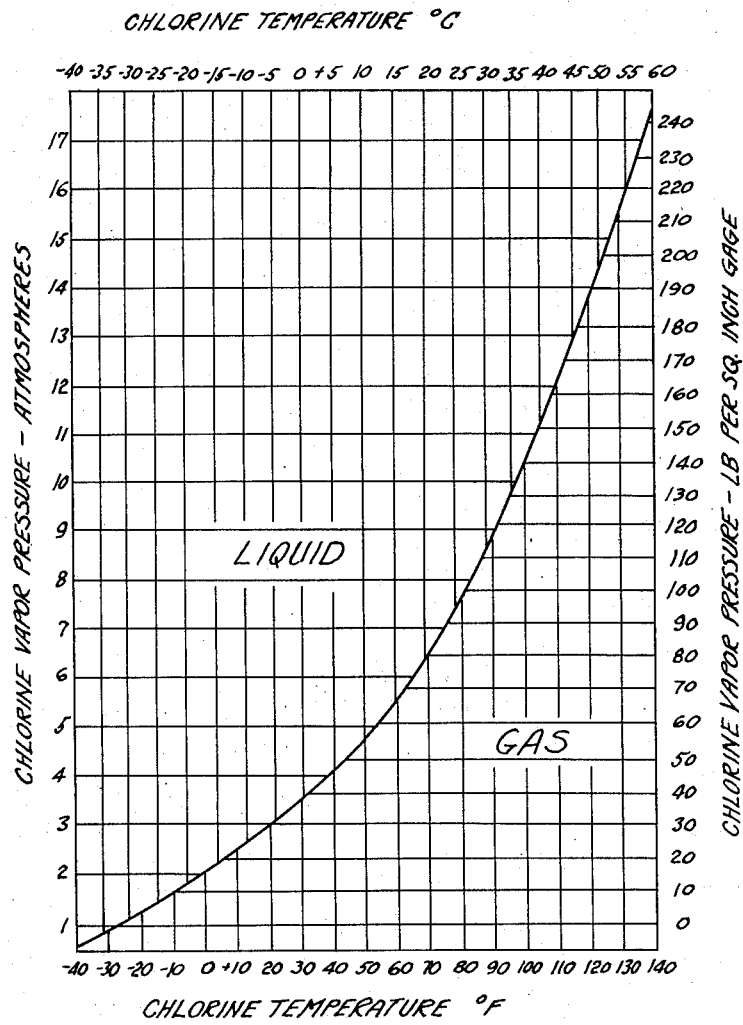

Other objects and advantages of the invention will be seen as the following description of a preferred embodiment thereof progresses in conjunction with the drawing in which:

FIG. 1 is a sectional view of the chlorine reacting vessel and associated equipment utilized in the preferred embodiment of the invention; and FIG. 2 is a graph indicating the vapor pressure of liquid chlorine at various conditions of pressure and temperature.

With the reference to FIG. 1 there is shown a reacting vessel in the form of an annular chamber 10 formed between the inner surface of a cylindrical housing 12 and a drum 14 which is mounted for rotation on a shaft 16. The shaft extends through the housing and suitable end enclosures 18, 20 are provided. Integral with each end enclosure there is provided a pulp slurry conduit, the left hand conduit 22 providing entrance of stock to be pumped into the reacting chamber 10 and the right hand conduit 24 providing an outlet passageway.

The ends of the shaft 16 are mounted in suitable bearing assemblies 26, only the left hand one being completely shown as the assemblies are identical and are of generally conventional design. A conventional packing and sealing assembly 28 is provided in each end housing to appropriately seal the apertures through which the shaft extends. A suitable prime mover is connected to the shaft at the left hand end thereof.

Disposed in the entrance passageway between the conduit 22 and the reacting chamber is a pump impeller 30 of the open vane type suitable for handling stock having a consistency in the order of three–five percent. The pump impeller vanes 32 cooperate with a pump housing member 34 that is bolted to the end enclosure member 18 and the end enclosure is in turn securely bolted to the cylindrical housing member 12. That housing is supported by a conventional footing structure 36 which is bolted to a base 38. At the output side of the reacting chamber there is provided a turbine impeller 40 similar in design to the pump impeller which enables power to be applied to the shaft 16 as the slurry passes from the high pressure environment in the reactant vessel to a lower pressure environment in the conduit 24. Each impeller is mounted on and secured to the shaft by means of a key 44. Each key also cooperates with an end web 46 of the drum to lock the drum on the shaft, thus insuring its rotation therewith. The drum may also include one or more intermediate supporting webs 48. To the outside of each impeller a sleeve 50 is positioned on the shaft which protects that member from the corrosive effects of the slurry. Both the inlet and outlet conduits and the reactant chamber are also lined with suitable corrosion-resistant material 52.

Connected to the input end enclosure 18 is a chlorine entrance conduit 54 and bolted to that enclosure is an adjustable needle valve structure 56 through which chlorine in the liquid phase may be directly introduced into the annular chamber 10 in a controlled manner from pipe 58. Chlorine may be injected at a number of points, if desired, say spaced around its periphery or possibly longitudinally thereof.

In operation the pulp to be chlorinated is moved by the pump impeller 30 from the conduit 22 into the pressure chamber 10 at a predetermined pressure. As the temperature of the pulp slurry normally ranges from 70–90° F. the pulp in the reactant chamber must be at a pressure greater than the vapor pressure of liquid chlorine at that temperature and it is preferred to operate the reactant chamber in the vicinity of 150 pounds per square inch gauge. As shown by the graph of FIG. 2 chlorine at this pressure and temperature is well above the dividing line between the liquid phase and the gaseous phase (indicated by the curve) and hence it remains in liquid condition. The design of the pump and the chamber are such that pulp slurry is readily introduced into the chamber at that pressure and is so maintained while remaining within the chamber. Chlorine in the liquid phase is introduced through pulp slurry immediately after the slurry leaves the pump impeller. The mixture is forced along through the chamber and the rotation of the drum tends to cause a generally helical circulation of the stock while it is being moved axially along the chamber. The stock, thoroughly mixed and partially reacted with the chlorine at the end of the chamber, is then passed through the turbine stage so that an amount of power is returned to the shaft during the pressure reduction thereby assisting in driving the shaft. The amount of power that can be returned by the turbine stage is dependent in part on whether an additional stock pump is utilized for passing the stock through the subsequent retention tower stage. Thus, the input impeller may be of smaller size or such design as to produce lesser head if a negative contribution to pumping efficiency is desired, for example. Similarly, the turbine may be similarly varied if higher pumping capabilities be desired of it. As the chlorine and pulp are thoroughly mixed there is no release of gaseous chlorine upon reduction of pressure and the mixture may then be transported to a retention tower or other suitable device for completion of the reaction.

Thus the invention provides a novel and markedly improved apparatus for the mixing of chlorine with brown stock slurries for the removal of lignin. The apparatus provides a novel pressure chamber into which the slurry is placed under temperature and pressure conditions in excess of the vapor pressure for chlorine, and chlorine in the liquid phase (not chlorine dissolved in water which is sometimes called liquid chlorine), introduced into the chamber, is, within the short time available during which brown stock is passing through the pressure chamber, continuously and completely mixed with the slurry without the chlorine passing into its gaseous phase before it is dissolved in the brown stock, so that upon reduction of the pressure no gaseous bubbles of chlorine form. Futhermore, it also acts as a centrifugal separator for air which may be present. The apparatus may be incorporated in a continuous process and permits the use of significantly smaller retention towers. In such an apparatus a pump impeller, suitable for handling slurries of this type forms one end closure of the pressure chamber and a turbine impeller forms the other end closure, together with the housing and rotor defining the annular pressure chamber. Thus the invention provides an apparatus that is capable of operation with low power requirements as the feeding operation returns substantial power through the turbine or, with suitable adjustment in the dimension of pump and turbine, the apparatus may function as a stock pump in addition to a chlorine reacting chamber. While a preferred embodiment of the invention has been shown and described herein various other modifications thereof will be obvious to those having ordinary skill in the art and it will be understood that the invention is not intended to be limited to the described embodiment or to details thereof and departures may be made therefrom within the spirit and scope of the invention as defined in the claims.

I claim:

1. Apparatus for mixing chlorine with a pulp stock comprising a stationary cylindrical housing having an inlet at one end thereof and an outlet at the other end thereof, a rotatable shaft extending through said housing having a rotatable drum mounted therein within said housing and extending therealong, pump impeller means mounted within said housing adjacent the inlet end thereof, fluid turbine impeller means mounted on said shaft adjacent the outlet end thereof, said housing, drum, pump impeller means and fluid turbine impeller means defining an annular pressure chamber for maintaining said pulp stock under pressure and temperature conditions in excess of those conditions required to maintain chlorine in liquid phase, and conduit means through the housing communicating directly with said chamber for introducing chlorine under pressure in liquid phase directly into said chamber adjacent the inlet end thereof for mixing chlorine in liquid phase with said pulp stock and dissolving it therein to provide chlorine in solution in said pulp stock without said chlorine passing into its gaseous phase while dissolving in said pulp stock.

2. Apparatus as set forth in claim 1 wherein said housing and rotor are generally cylindrical and coaxial with one another providing a straight annular passageway from said pump impeller means to said turbine impeller means.

References Cited in the file of this patent
UNITED STATES PATENTS

| | | |
|---|---|---|
| 2,010,405 | MacIsaac | Aug. 6, 1935 |
| 2,339,883 | Schaub | Jan. 25, 1944 |
| 2,898,092 | Miller | Aug. 4, 1959 |